US012361882B2

(12) United States Patent
Hwang et al.

(10) Patent No.: US 12,361,882 B2
(45) Date of Patent: Jul. 15, 2025

(54) ELECTROLUMINESCENT DISPLAY APPARATUS AND METHOD OF DRIVING THE SAME

(71) Applicant: LG Display Co., Ltd., Seoul (KR)

(72) Inventors: Ho Seong Hwang, Paju-si (KR); Hyun Woo Cho, Paju-si (KR); Seung Yeon Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/521,498

(22) Filed: Nov. 28, 2023

(65) Prior Publication Data

US 2024/0221657 A1 Jul. 4, 2024

(30) Foreign Application Priority Data

Dec. 28, 2022 (KR) ........................ 10-2022-0187711

(51) Int. Cl.

*G09G 3/00* (2006.01)
*G09G 3/3208* (2016.01)
*G09G 3/3233* (2016.01)

(52) U.S. Cl.

CPC ....... *G09G 3/3233* (2013.01); *G09G 2310/08* (2013.01); *G09G 2320/0233* (2013.01);
(Continued)

(58) Field of Classification Search

None
See application file for complete search history.

(56) References Cited

U.S. PATENT DOCUMENTS 10,503,422 B2 12/2019 Kim et al.
2003/0210256 A1 11/2003 Mori et al.
(Continued)

FOREIGN PATENT DOCUMENTS

JP H11-15437 A 1/1999
JP 2003-280592 A 10/2003
(Continued)

OTHER PUBLICATIONS

Office Action issued on Sep. 30, 2024 in Taiwanese Patent Application No. 112151363 (with partial English translation).
(Continued)

*Primary Examiner* — Carl Adams
(74) *Attorney, Agent, or Firm* — Morgan, Lewis & Bockius LLP

(57) ABSTRACT

An electroluminescent display apparatus may include a display panel including a plurality of pixels, each of the pixels including a light emitting device, and a controller. The controller may be configured to receive an input image data for a corresponding pixel among the pixels, determine accumulated stress data applied to the light emitting device in the corresponding pixel due to an accumulation of image implemented in the corresponding pixel while being driven, determine a stress compensation gain corresponding to the accumulated stress data, determine a target compensation gain based on the stress compensation gain and at least one of a lower limit compensation gain and an upper limit compensation gain, and output a corrected input image data based on the input image data and the target compensation gain for driving the corresponding pixel.

20 Claims, 7 Drawing Sheets

(52) U.S. Cl.
CPC ............... *G09G 2320/0257* (2013.01); *G09G 2320/045* (2013.01); *G09G 2320/048* (2013.01)

(56) References Cited

U.S. PATENT DOCUMENTS

| | | | | |
|---|---|---|---|---|
| 2013/0147693 | A1 | 6/2013 | Bae | |
| 2014/0168039 | A1 | 6/2014 | Kim et al. | |
| 2016/0189634 | A1 | 6/2016 | Kim et al. | |
| 2018/0151117 | A1 | 5/2018 | Choi et al. | |
| 2020/0074906 | A1 | 3/2020 | Lee et al. | |
| 2022/0068204 | A1 | 3/2022 | Iwauchi et al. | |
| 2022/0366822 | A1* | 11/2022 | Leerentveld | G09G 3/3233 |

FOREIGN PATENT DOCUMENTS

| | | | |
|---|---|---|---|
| JP | 2014-123126 | A | 7/2014 |
| JP | 2018-087974 | A | 6/2018 |
| TW | 201426712 | A | 7/2014 |
| TW | 202125481 | A | 7/2021 |

OTHER PUBLICATIONS

Office Action issued on Nov. 20, 2024 in corresponding UK Patent Application No. GB2318456.7 (Note—US 2014/0168039 A1 cited in this UK Office Action was cited in a prior IDS.).

Office Action issued on Dec. 3, 2024 in corresponding Japanese Patent Application No. 2023-205920 (with English translation).

* cited by examiner

| Time (hrs) | Stress Data | Stress Compensation Gain |
|---|---|---|
| 0 | 0.00E+00 | 1.00 |
| 1 | 2.89E-05 | 1.00 |
| 2 | 5.77E-05 | 1.00 |
| ⋮ | ⋮ | ⋮ |
| 59999 | 5.11E+00 | 0.50 |
| 60000 | 5.12E+00 | 0.50 |

ELECTROLUMINESCENT DISPLAY APPARATUS AND METHOD OF DRIVING THE SAME

CROSS-REFERENCE TO RELATED APPLICATION

This application claims the benefit of and priority to the Korean Patent Application No. 10-2022-0187711, filed on Dec. 28, 2022, which is hereby incorporated by reference as if fully set forth herein.

BACKGROUND

Technical Field

The present disclosure relates to an electroluminescent display apparatus and a method of driving the same.

Discussion of the Related Art

Electroluminescent display apparatuses may be categorized into inorganic light emitting display apparatuses and electroluminescent display apparatuses, based on a material of an emission layer. Each pixel of an electroluminescent display apparatus includes a light emitting device self-emitting light and controls the amount of light emitted from the light emitting device with a data voltage based on a gray level of image data to adjust luminance.

A degradation characteristic of a light emitting device may be changed in pixels as an amount of accumulated driving time increases over time. When a degradation deviation among the pixels occurs, a driving current contributing to the emission of light in the pixels varies among the pixels despite the application of the same data voltage. A deviation of a driving current causes luminance non-uniformity (e.g., an afterimage) to degrade image quality.

The description provided in this related art section should not be assumed to be prior art merely because it is mentioned in or associated with the description of the related art section. The description of the related art section may include information that describes one or more aspects of the subject technology, and the description in this section does not limit the present disclosure.

SUMMARY

The present disclosure is directed to a light-emitting display apparatus that substantially obviates one or more of the problems due to limitations and disadvantages of the related art.

In electroluminescent display apparatuses, various attempts for delaying a degradation in pixels are being done, but because a viewing behavior of a user is not considered, an effect of improving an afterimage is slight.

To overcome or mitigate the aforementioned problem of the related art, the present disclosure may provide an electroluminescent display apparatus and a method of driving the same, which adaptively adjust the degree of reduction in luminance on the basis of a viewing behavior of a user to increase an effect of preventing or reducing an afterimage.

Additional features and aspects of the disclosure will be set forth in the description that follows and in part will become apparent from the description or may be learned by practice of the inventive concepts provided herein. Other features and aspects of the inventive concepts may be realized and attained by the structure particularly pointed out in, or derivable from, the written description, claims hereof, and the appended drawings.

To achieve these objects and other advantages of the present disclosure, as embodied and broadly described herein, an electroluminescent display apparatus may include: a display panel including a plurality of pixels, each of the pixels including a light emitting device; and a controller configured to receive an input image data for a corresponding pixel among the pixels, determine accumulated stress data applied to the light emitting device in the corresponding pixel due to an accumulation of image implemented in the corresponding pixel while being driven, determine a stress compensation gain corresponding to the accumulated stress data, determine a target compensation gain based on the stress compensation gain and at least one of a lower limit compensation gain and an upper limit compensation gain, and output a corrected input image data based on the input image data and the target compensation gain for driving the corresponding pixel.

In another aspect of the present disclosure, a method of driving an electroluminescent display apparatus, comprising a display panel including a plurality of pixels each having a light emitting device, may include: receiving an input image data for a corresponding pixel among the pixels; determining accumulated stress data applied to the light emitting device in the corresponding pixel due to an accumulation of image implemented in the corresponding pixel while driven; determining a stress compensation gain corresponding to the accumulated stress data; calculating a target compensation gain based on the stress compensation gain and at least one of a lower limit compensation gain and an upper limit compensation gain; outputting a corrected input image data based on the input image data and the target compensation gain; and driving the corresponding pixel based on the corrected input image data.

In yet another aspect of the present disclosure, a display apparatus may include: a display panel including a plurality of pixels, each of the pixels including a light emitting device; and a controller configured to receive an input image data for a corresponding pixel among the pixels, determine accumulated stress data representing accumulated stress applied to the light emitting device of the corresponding pixel due to an image implemented in the corresponding pixel while driven, determine a target compensation gain based on the accumulated stress data, and output a corrected input image data based on the input image data and the target compensation gain; and a driver configured to drive the corresponding pixel based on the corrected image data.

In addition to the above-mentioned advantages of the present disclosure, other features and advantages of the present disclosure will be described below or may be clearly understood by those skilled in the art from such description or explanation.

It is to be understood that both the foregoing general description and the following detailed description of the present disclosure are by way of example and are intended to provide further explanation of the disclosures as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Figure 1:
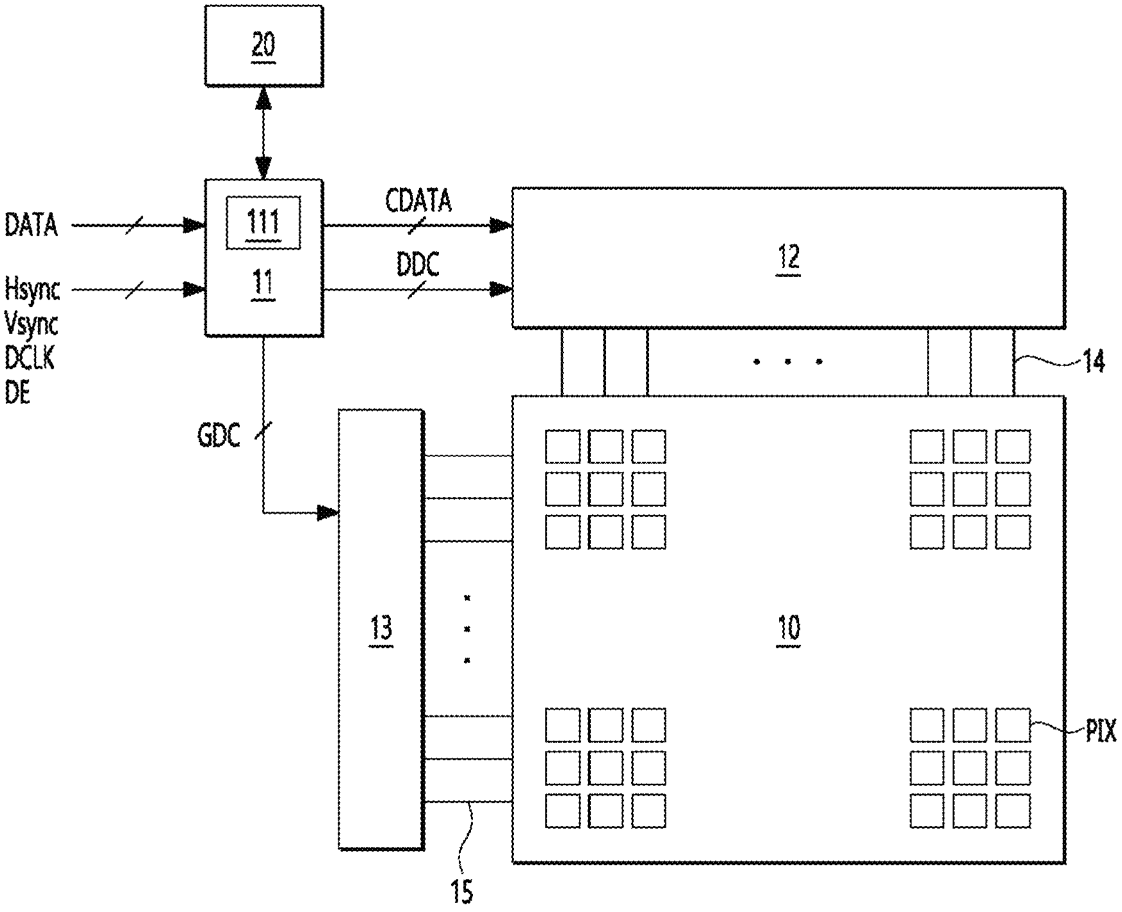
FIG. 1 is a block diagram illustrating an electroluminescent display apparatus according to an example embodiment of the present disclosure.

It is to be understood that both the foregoing general description and the following detailed description of the present disclosure are by way of example and are intended to provide further explanation of the disclosures as claimed.

Throughout the drawings and the detailed description, unless otherwise described, like reference numerals should be understood to refer to like elements, features, or structures. The relative size and depiction of these elements as shown in the drawings may be exaggerated for clarity, illustration, or convenience.

In the following description, where a detailed description of well-known functions or configurations related to this document may unnecessarily obscure aspects of the present disclosure, the detailed description of such known functions or configures may be omitted.

Although the terms “first,” “second,” A, B, (a), (b), and the like may be used herein to describe various elements, these elements should not be interpreted to be limited by these terms as they are not used to define a particular essence, order, sequence, precedence, or number of such elements. These terms are used only to distinguish one element from another. For example, a first element could be termed a second element, and, similarly, a second element could be termed a first element, without departing from the scope of the present disclosure.

In construing an element, the element is to be construed as including an error or tolerance range even where no explicit description of such an error or tolerance range is provided.

FIG. 1 is a block diagram illustrating an electroluminescent display apparatus according to an example embodiment of the present disclosure.

As shown in FIG. 1, the electroluminescent display apparatus according to an example embodiment of the present disclosure may include a display panel 10, a timing controller 11, a data driver 12, a gate driver 13, a memory circuit 20, and an afterimage reduction circuit 111. In FIG. 1, all or some of the timing controller 11 and the data driver 12 may be integrated into a driving integrated circuit (IC).

In a screen displaying an input image in the display panel 10, data lines 14 extending in a column direction (or a vertical direction) may intersect with gate lines 15 extending in a row direction (or a horizontal direction). A plurality of pixels PIX may be respectively provided in a plurality of intersection areas and may be arranged in a matrix form to configure a pixel array. Each of the data lines 14 may be commonly connected with pixels PIX adjacent to one another in the column direction, and each of the gate lines 15 may be commonly connected with pixels PIX adjacent to one another in the row direction.

The pixels PIX included in the pixel array may be grouped into a plurality of groups and may implement various colors. When a pixel group for implementing colors is defined as a unit pixel, one unit pixel may include red (R), green (G), and blue (B) pixels, or may include red (R), green (G), blue (B), and white (W) pixels.

Each of the pixels PIX may include a light emitting device and a driving element which generates a driving current with a gate-source voltage thereof to drive the light emitting device. The light emitting device may include an anode electrode, a cathode electrode, and an organic compound layer formed between the anode and cathode electrodes. The organic compound layer may include a hole injection layer (HIL), a hole transport layer (HTL), an emission layer (EML), an electron transport layer (ETL), and an electron injection layer (EIL), but is not limited thereto. When a driving current flows in the light emitting device, a hole passing through the hole transport layer (HTL) and an electron passing through the electron transport layer (ETL) may move to the emission layer (EML) to generate an exciton, and the emission layer (EML) may emit visible light. Also, the organic compound layer may be replaced with an inorganic compound layer.

The driving element may be implemented with an oxide thin film transistor or a low temperature polysilicon (LTPS) transistor on a glass substrate (or a plastic substrate), but is not limited thereto. The driving element may be implemented with a complementary metal-oxide semiconductor (CMOS) transistor on a silicon wafer (Si-wafer).

Attempts for implementing some elements (particularly, a switching element where a source or a drain is connected with a gate of a driving element) of a pixel circuit as oxide transistors are increasing. Each of a driving element and switching elements included in a pixel circuit may be implemented as an oxide transistor. The oxide transistor may use, as a semiconductor material, oxide such as indium gallium zinc oxide (IGZO) where indium (In), gallium (Ga), zinc (Zn), and oxygen (O) are combined, instead of polysilicon. The oxide transistor may have a 10 or more times higher electron mobility than an amorphous silicon transistor and may have a lower manufacturing cost than an LTPS transistor. Also, because the oxide transistor has a relatively low off current, driving stability and reliability may be high in low speed driving where an off period of a transistor is relatively long. Accordingly, the oxide transistor may be applied to an organic light emitting diode (OLED) television (TV) which requires a high resolution or low-power driving or is incapable of adjusting a screen size through an LTPS process.

An electrical characteristic (for example, an operation point voltage or a threshold voltage) of a light emitting device should be uniform in all pixels, but a difference between pixels PIX (hereinafter referred to as a degradation deviation between pixels) may occur due to stress caused by the accumulation of a driving time. When a degradation deviation between pixels PIX occurs, a driving current contributing to the emission of light in the pixels PIX may vary between the pixels PIX despite the application of the same data voltage. A deviation of the driving current may cause an afterimage to degrade image quality.

The afterimage reduction circuit 111 may use a hybrid luminance reduction method where a timer-based luminance reduction method and an OLED stress-based luminance reduction method are used in combination to delay a degradation in pixels PIX.

The timer-based luminance reduction method may be a method of gradually reducing luminance on the basis of a target compensation gain which is set based on an amount of accumulated driving time of a light emitting device. According to the timer-based luminance reduction method, because luminance decreases based on only the amount of accumulated driving time regardless of a viewing condition, such as the kind or intensity of an image, an afterimage reduction effect may not largely compensate for a high stress-based image or a heavy use-based image.

The OLED stress-based luminance reduction method may be a method of adjusting the degree of reduction in luminance based on a viewing behavior of a consumer to reduce stress. According to the OLED stress-based luminance reduction method, the amount of reduction in luminance may be changed based on a viewing condition.

The hybrid luminance reduction method according to an example embodiment of the present disclosure may calculate accumulated stress data applied to a light emitting device by using an accumulated image implemented in a pixel PIX for an amount of accumulated driving time. If the accumulated stress data is less than a predetermined reference stress value, the hybrid luminance reduction method may reduce luminance at a level determined by the timer-based luminance reduction method. On the other hand, if the accumulated stress data is greater than or equal to the reference stress value, the hybrid luminance reduction method may reduce luminance at a level determined by the OLED stress-based luminance reduction method.

The hybrid luminance reduction method according to an example embodiment of the present disclosure may set a lower limit of the target compensation gain based on the amount of accumulated driving time to prevent luminance from being excessively reduced under a viewing condition where stress is large.

The hybrid luminance reduction method according to an example embodiment of the present disclosure may set an upper limit of the target compensation gain based on the amount of accumulated driving time to prevent an increase in device luminance or the occurrence of an inverse afterimage caused by overcompensation.

The afterimage reduction circuit 111 may be equipped in the timing controller 11 but is not limited thereto. The afterimage reduction circuit 111 may compensate for input image data DATA with the target compensation gain to generate corrected image data CDATA and may supply the corrected image data CDATA to the data driver 12.

The timing controller 11 may receive a timing signal, such as a vertical synchronization signal Vsync, a horizontal synchronization signal Hsync, a data enable signal DE, and a dot clock DCLK, from a host system to generate timing control signals for controlling an operation timing of each of the data driver 12 and the gate driver 13. The timing control signals may include a gate timing control signal GDC and a data timing control signal DDC.

The data driver 12 may be connected with pixels PIX through the data lines 14. The data driver 12 may generate data voltages for driving the pixels PIX and may supply the data voltages to the data lines 14. The data driver 12 may sample and latch the corrected image data CDATA input from the afterimage reduction circuit 111 to generate parallel data, based on the data timing control signal DDC, and may map the parallel data to gamma compensation voltages to generate analog data voltages. The data voltages may have different voltage levels to correspond to image gray levels which are to be implemented in the pixels PIX.

The data driver 12 may be configured with a plurality of source driver ICs. Each of the source driver ICs may include a shift register, a latch, a level shifter, a digital-to-analog converter (DAC), and an output buffer.

The gate driver 13 may be connected with pixels PIX through the gate lines 15. The gate driver 13 may generate scan signals, based on the gate timing control signal GDC, and may supply the scan signals to the gate lines 15 based on a supply timing of data voltages. A horizontal pixel line to which data voltages are to be supplied may be selected by the scan signal. Each of the scan signals may be generated as a pulse type which swings between a gate-on voltage and a gate-off voltage. The gate-on voltage may be set to a voltage which is higher than a threshold voltage of a switching transistor, and the gate-off voltage may be set to a voltage which is lower than the threshold voltage of the switching transistor. The switching transistor may be turned on in response to the gate-on voltage and may be turned off in response to the gate-off voltage.

The gate driver 13 may be configured with a plurality of gate driver ICs each of which may include a gate shift register, a level shifter for converting an output signal of the gate shift register into a signal having a swing width suitable for transistor driving of a pixel, and an output buffer. Alternatively, the gate driver 13 may be directly mounted on a substrate of the display panel 10 in a gate driver in panel (GIP) type. In the GIP type, the level shifter may be mounted on a printed circuit board (PCB), and the gate shifter register may be provided in a bezel area which is a non-display area of the display panel 10. The gate shifter register may include a plurality of scan output stages connected with one another in a cascade type. The scan output stages may be independently connected with the gate lines, respectively, and may output the scan signals to the respective gate lines 15.

The memory circuit 20 may store a predetermined target compensation gain graph. The target compensation gain graph may define an operation range of the target compensation gain according to the amount of accumulated driving time and the accumulated stress data and may include a plurality of lookup tables. The memory circuit 20 may be implemented as a NAND memory or flash memory, but is not limited thereto.

Figure 2:
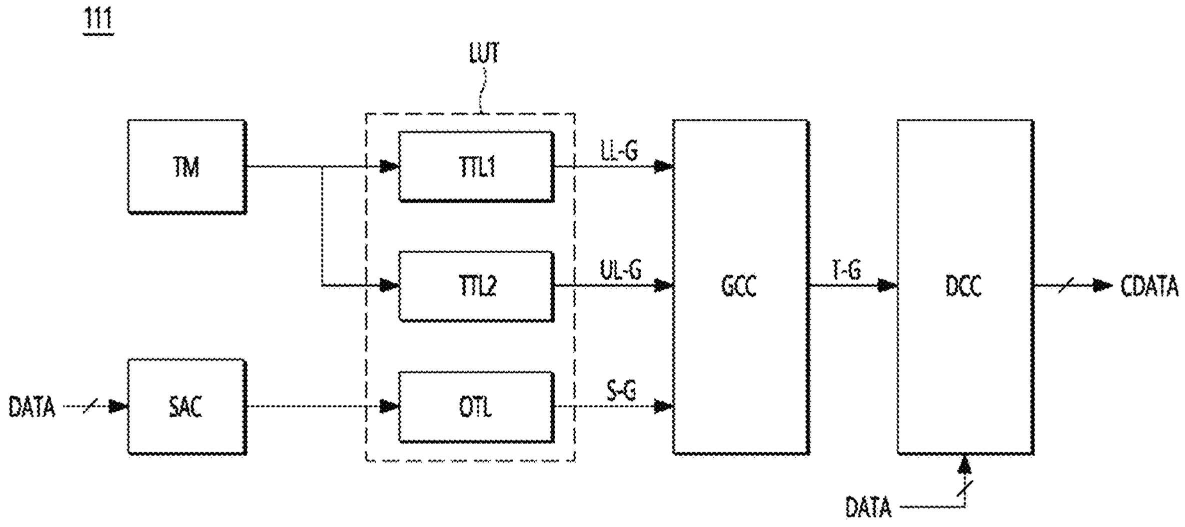
FIG. 2 is a block diagram illustrating an afterimage reduction circuit according to an example embodiment of the present disclosure.
Figure 3:
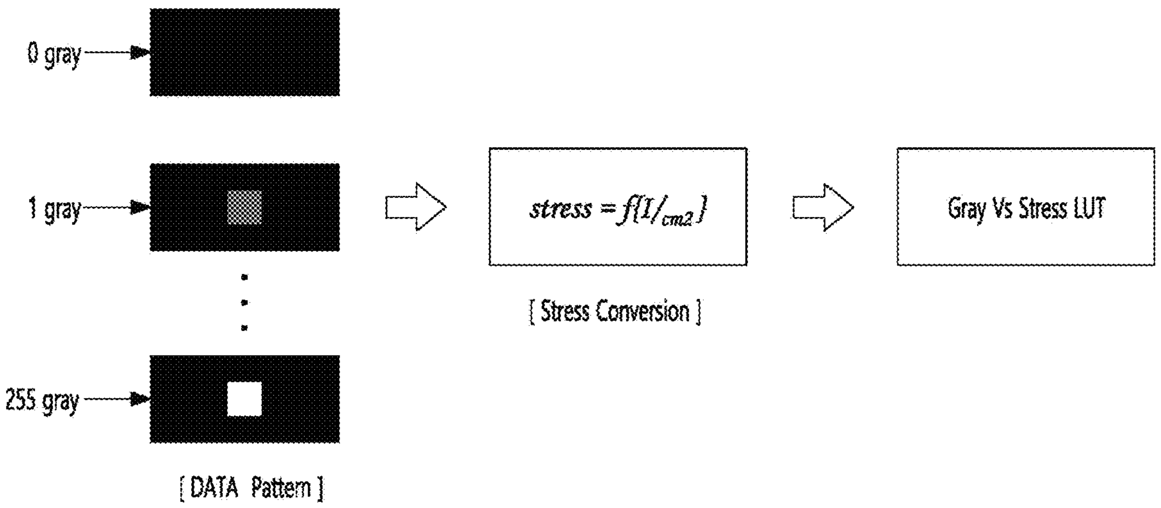
FIG. 3 is a diagram illustrating a stress conversion operation performed by a stress accumulation circuit according to an example embodiment of the present disclosure.
Figures 4, 5:
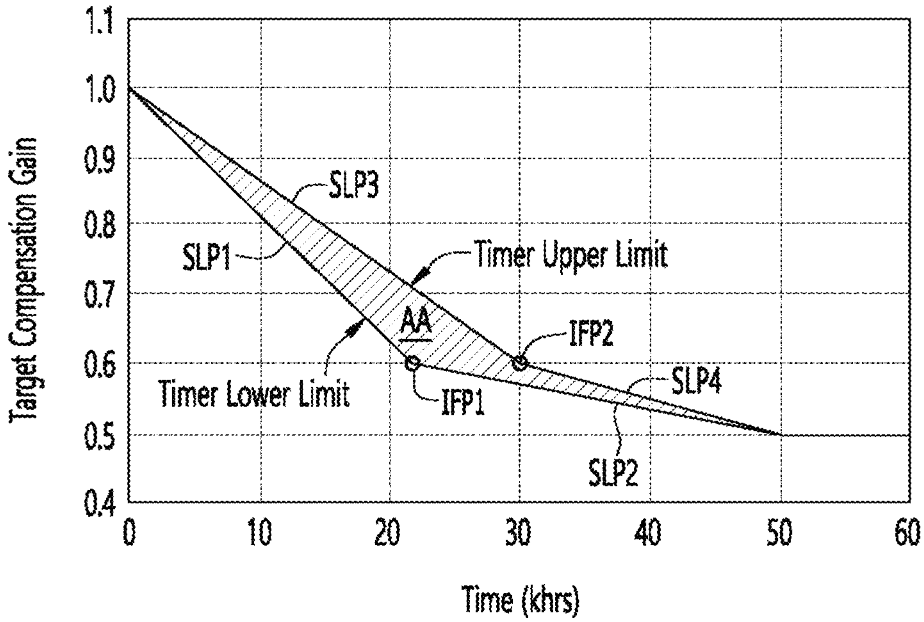
FIG. 4 is a diagram illustrating accumulated stress data and a stress compensation gain mapped to the accumulated stress data with respect to an amount of accumulated driving time according to an example embodiment of the present disclosure.
FIG. 5 is a diagram illustrating a setting range of a target compensation gain with respect to an amount of accumulated driving time according to an example embodiment of the present disclosure.
Figure 6:
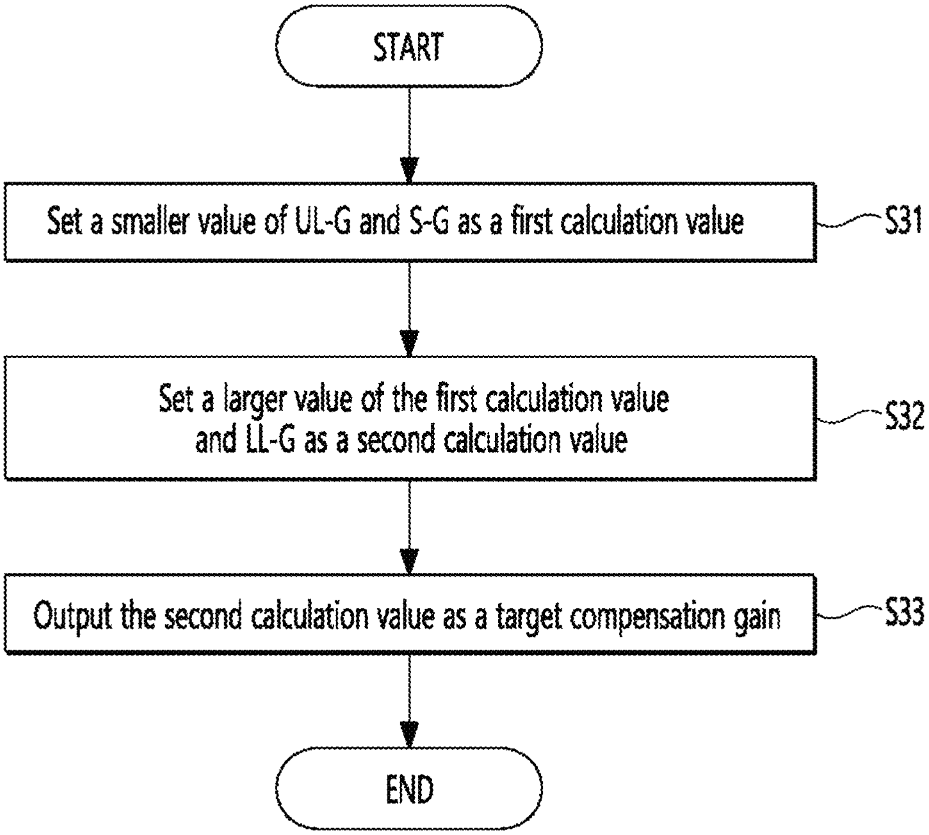
FIG. 6 is a diagram illustrating an operation sequence of a gain calculation circuit according to an example embodiment of the present disclosure.

FIG. 2 is a block diagram illustrating an afterimage reduction circuit according to an example embodiment of the present disclosure. FIG. 3 is a diagram illustrating a stress conversion operation performed by a stress accumulation circuit according to an example embodiment of the present disclosure. FIG. 4 is a diagram illustrating accumulated stress data and a stress compensation gain mapped to the accumulated stress data with respect to an amount of accumulated driving time. FIG. 5 is a diagram illustrating a setting range of a target compensation gain with respect to an amount of accumulated driving time. FIG. 6 is a diagram illustrating an operation sequence of a gain calculation circuit according to an example embodiment of the present disclosure.

As illustrated in FIG. 2, the afterimage reduction circuit 111 may include a timer TM, a stress accumulation circuit SAC, a lookup circuit LUT, a gain calculation circuit GCC, and a data compensation circuit DCC.

The timer TM may count an amount time for which a light emitting device included in each pixel is emitting light, thereby outputting an amount of accumulated driving time. The amount of accumulated driving time may be a sum of time periods for which an image is reproduced on a display panel. The timer TM may count an amount of time, for which a screen of the display panel is in a turn-on state, to output the amount of accumulated driving time.

The stress accumulation circuit SAC may calculate accumulated stress data representing an accumulated amount of stress applied to the light emitting device due to an image implemented in a pixel during the accumulated driving time. The stress accumulation circuit SAC, as illustrated in FIG. 3, may calculate a stress value corresponding to each gray level of input image data DATA with reference to a predetermined stress conversion lookup table. The stress value may represent a predicted degradation amount of a light emitting device with respect to the amount of accumulated driving time. In the stress conversion lookup table, the stress value corresponding to each gray level of the input image data DATA may be mapped to the amount of accumulated driving time. The stress conversion lookup table may be constructed in advance by using a stress value conversion algorithm. Examples of such a stress value conversion algorithm may include, without limitation, below equations.

$$\text{Stress} = I^n \qquad \text{(Equation 1)}$$

$$\text{Stress} = I^* \exp(Ea/KT) \qquad \text{(Equation 2)}$$

Here, "I" is current, "n" is a luminance acceleration coefficient, "Ea" is an activation energy, "K" is the Boltzmann constant, and "T" is temperature.

In a data pattern application operation, a current may be measured by applying a grayscale-based data pattern to the display panel in pre-degradation initial state. In a stress value conversion operation, a measurement current value may be converted into a stress value by using a predetermined function formula, e.g., one of the above stress conversion algorithms. However, the present disclosure is not limited thereto. Stress may generally be determined as a function of several factors that affect pixel life, and a given function may be selected by a person skilled in the art. For example, such a function may be expressed as one of the below general functions.

$$\text{Stress} = f(\text{current density, temperature, } \ldots) \qquad \text{(Equation 3)}$$

$$\text{Stress} = f(\text{factor 1, factor 2, factor 3, } \ldots) \qquad \text{(Equation 4)}$$

The stress accumulation circuit SAC may output the accumulated stress data calculated based on the stress conversion lookup table. The stress accumulation circuit SAC may further include an internal memory for updating and storing the accumulated stress data.

The lookup circuit LUT may include a plurality of lookup tables which are downloaded from the memory circuit 20 when a system power is turned on. The lookup circuit LUT may include a lower limit target lookup table TTL1, an upper limit target lookup table TTL2, and a stress target lookup table OTL.

The lower limit target lookup table TTL1 may output a lower limit compensation gain LL-G by using the amount of accumulated driving time, input from the timer TM, as a read address. The lower limit compensation gain LL-G may be located at a timer lower limit of the target compensation gain graph of FIG. 5.

The upper limit target lookup table TTL2 may output an upper limit compensation gain UL-G by using the amount of accumulated driving time, input from the timer TM, as a read address. The upper limit compensation gain UL-G may be located at a timer upper limit of the target compensation gain graph of FIG. 5.

The stress target lookup table OTL may output a stress compensation gain S-G by using the accumulated stress data, input from the stress accumulation circuit SAC, as a read address. The stress target lookup table OTL, for example, may be constructed as in FIG. 4. In FIG. 4, accumulated stress data based on the amount of accumulated driving time and a stress compensation gain S-G mapped to the accumulated stress data may be set in advance. The stress compensation gain S-G may be located within a gain region AA surrounded by the timer lower limit and the timer upper limit in the target compensation gain graph of FIG. 5.

The gain calculation circuit GCC may calculate a target compensation gain T-G based on the lower limit compensation gain LL-G, the upper limit compensation gain UL-G, and the stress compensation gain S-G input from the lookup circuit LUT.

The gain calculation circuit GCC, as shown in FIG. 6, may set the smaller of the upper limit compensation gain UL-G and the stress compensation gain S-G as a first calculation value (S31). Subsequently, the gain calculation circuit GCC may set the larger of the first calculation value and the lower limit compensation gain LL-G as a second calculation value (S32). Subsequently, the gain calculation circuit GCC may output the second calculation value as the target compensation gain (S33).

The data compensation circuit DCC may down-correct image data DATA to be written in a pixel based on the target compensation gain input from the gain calculation circuit GCC. The target compensation gain multiplied by the image data DATA may be less than or equal to 1 as shown in FIG. 5. Thus, corrected image data CDATA may decrease to an original grayscale value or less.

The hybrid luminance reduction method according to an example embodiment of the present disclosure may be implemented with an operation of the afterimage reduction circuit 111 based on the target compensation gain graph of FIG. 5. A shape of the target compensation gain graph may be set like the graph of FIG. 5 so that the degree of reduction in luminance is adaptively adjusted based on the amount of accumulated driving time and a viewing behavior of a user.

More specifically, the timer lower limit and the timer upper limit may have the same first target compensation gain at a first amount of accumulated driving time (e.g., 0 hour) of the target compensation gain graph, and may have the same second target compensation gain at a second amount of accumulated driving time (e.g., 50000 hours) of the target compensation gain graph greater than the first amount of accumulated driving time (e.g., 0). Also, at a third amount of accumulated driving time (e.g., 0~50,000 hours) of the target compensation gain graph between the first amount of accumulated driving time (e.g., 0) and the second amount of accumulated driving time (e.g., 50,000 hours), the timer lower limit may have a third target compensation gain, and the timer upper limit may have a fourth target compensation gain greater than the third compensation gain. Here, the first target compensation gain may be 1, the second target compensation gain may be 0.5, the third target compensation gain may have a first value between 0.5 and 1, the fourth target compensation gain may have a second value between 0.5 and 1, and the second value may be greater than the first value.

Excessively reducing luminance for the purpose of afterimage reduction may not be preferable because the visibility of a displayed image to a user may be hindered. The inventors have set a minimum value of the target compensation gain to 0.5 and have determined a luminance specification with respect to an amount of accumulated time (e.g., 50,000 hours) for which luminance reaches 50%, through multiple experiments.

In the target compensation gain graph, the timer lower limit and the timer upper limit may each be designed to have an inflection point in the target compensation gain of about 0.6, so as to increase an afterimage reduction effect and extend to, e.g., 50,000 hours.

More specifically, the timer lower limit may include a first lower limit line SLP1 having a first slope and a second lower limit line SLP2 having a second slope gentler than the first slope. The first lower limit line SLP1 and the second lower limit line SLP2 may be connected with each other at a first inflection point IFP1.

The timer upper limit may include a first upper limit line SLP3 having a third slope and a second upper limit line SLP4 having a fourth slope gentler than the third slope. The first upper limit line SLP3 and the second upper limit line SLP4 may be connected with each other at a second inflection point IFP2.

The first lower limit line SLP1 having the first slope may match the first upper limit line SLP3 having the third slope at the first amount of accumulated driving time (e.g., 0 hour). Also, the second lower limit line SLP2 having the second slope may match the second upper limit line SLP4 having the fourth slope at the second amount of accumulated driving time (e.g., 50,000 hours) greater than the first amount of accumulated driving time (e.g., 0 hour).

The second slope may be gentler than the first slope, and the fourth slope may be gentler than the third slope. Because luminance may be relatively quickly reduced before a light emitting device is degraded by the first and third slopes, which are relatively steep slopes, an afterimage may be reduced. Also, because the second amount of accumulated driving time (e.g., 50,000 hours) may be increased by the second and fourth slopes, which are relatively gentle slopes, the visibility for a user may be improved.

Figure 7:
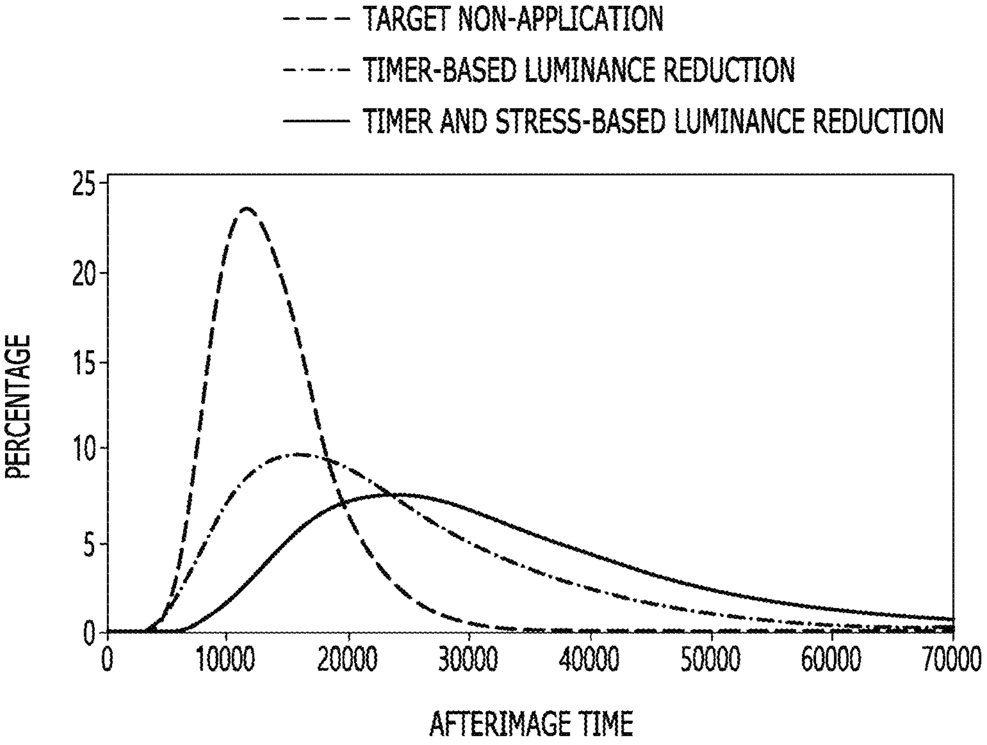
FIG. 7 is a diagram illustrating an afterimage distribution with respect to an amount of accumulated driving time when a timer and stress-based luminance reduction algorithm are applied.

FIG. 7 is a diagram illustrating an afterimage distribution with respect to an amount of accumulated driving time when a timer and stress-based luminance reduction algorithm is applied.

As shown in FIG. 7, the hybrid luminance reduction method according to an example embodiment of the present disclosure may adaptively adjust the degree of reduction in luminance on the basis of an amount of accumulated driving time and a viewing behavior of a user. Thus, in comparison with other luminance reduction methods (target non-application and timer-based luminance reduction methods), the hybrid luminance reduction method may lower a rate at which an afterimage occurs after a relatively small amount of accumulated driving time (e.g., 10,000-20,000 hours).

Figure 8:
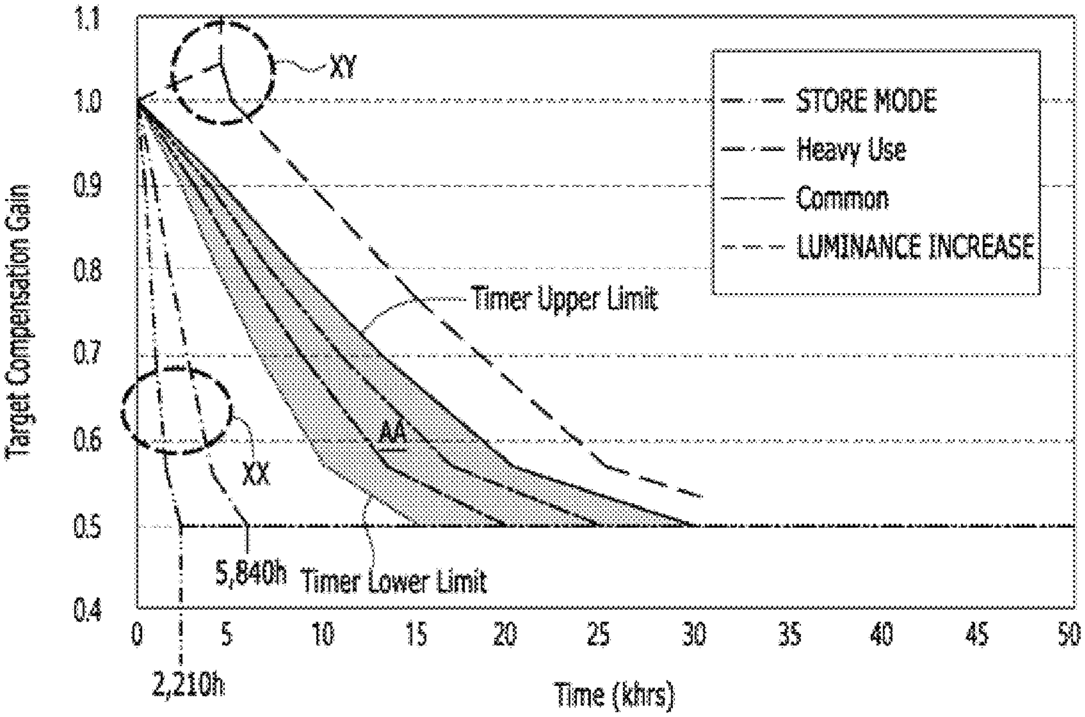
FIG. 8 is a diagram for describing a potential risk when a timer upper limit and a timer lower limit are not set in a target compensation gain graph.

FIG. 8 is a diagram for describing a potential risk when a timer upper limit and a timer lower limit are not set in a target compensation gain graph.

A potential risk with having no timer lower limit may be described through a store mode and a heavy use mode illustrated in FIG. 8 (see portion XX of the graph). The store mode may use high luminance for the purpose of, for example, a sale promotion, and luminance may reach 50% after about 2,200 hours of accumulated driving time. The heavy use mode may be, for example, for gaming, and excessive stress may be applied to a light emitting device. Here, luminance may reach 50% after about 5,800 hours of accumulated driving time. As described above, when there is no timer lower limit, luminance may be excessively reduced within a relatively short period of time. As a result, the visibility of the displayed image for a user may be excessively reduced.

A potential risk with having no timer upper limit may be described through a luminance increase mode illustrate in FIG. 8 (see portion XY of the graph). The luminance increase mode may increase luminance of a device or cause overcompensation, and stress applied to a light emitting device may be accelerated and an inverse afterimage may occur.

On the other hand, a hybrid luminance reduction method according to an example embodiment of the present disclosure may include a timer lower limit, a timer upper limit, and the gain region AA. Thus, the potential problems described above may be prevented.

Figure 9:
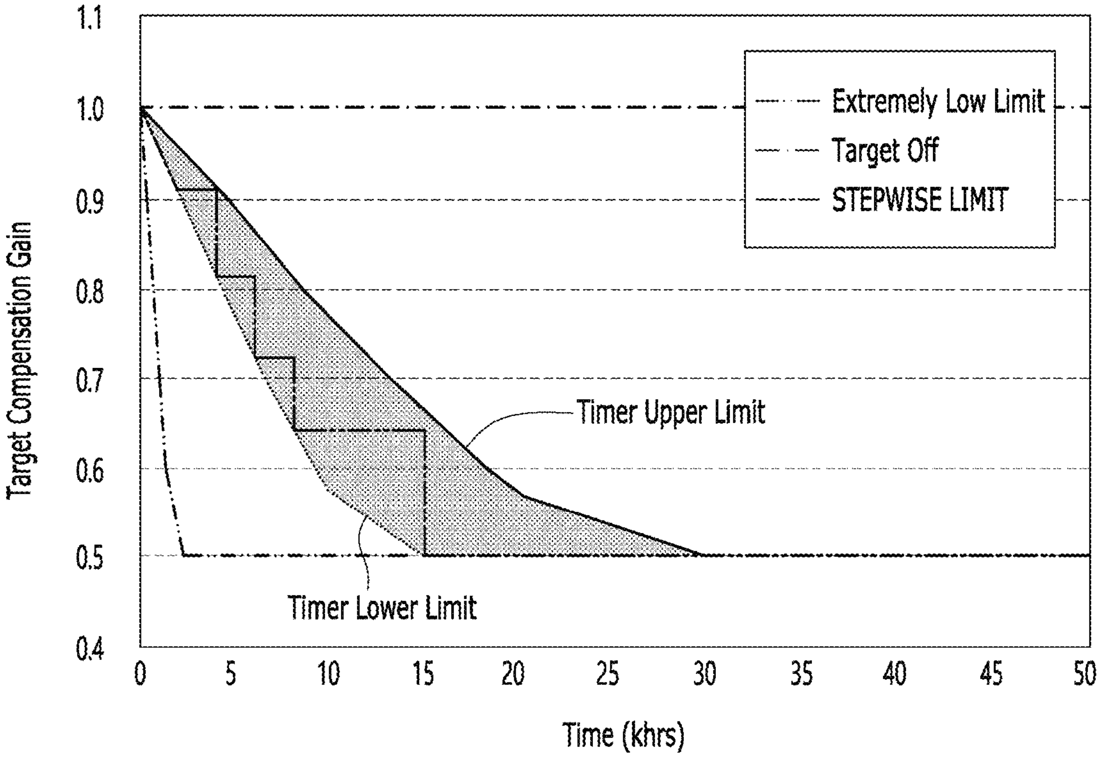
FIG. 9 is a diagram for describing a compensation result based on various shapes of a timer upper limit and a timer lower limit which are set in a target compensation gain graph.

FIG. 9 is a diagram for describing a compensation result based on various shapes of a timer upper limit and a timer lower limit which may be set in a target compensation gain graph.

As illustrated in FIG. 9, if a timer lower limit is set to a step shape, luminance may be rapidly reduced in step down portions. As a result, the visibility of the displayed image for a user may be rapidly reduced. Setting a timer upper limit to a step shape may similarly reduce the visibility for a user. Thus, in terms of the visibility for a user, gradually reducing luminance over a longer period of time may be preferable.

Moreover, if the timer lower limit is set to be excessively low, luminance performance may not be maintained due to an excessive reduction in luminance.

Also, if a target is not set, stress applied to a light emitting device may be accelerated due to high luminance, and an inverse afterimage may occur.

On the other hand, each of the timer lower limit and the timer upper limit according to an example embodiment of the present disclosure may have a slope inflection point and may have a shape where luminance is gradually reduced. Thus, an afterimage may be effectively reduced without hindering the visibility for a user.

Example embodiments of the present disclosure may realize the following effects and advantages.

The example embodiments may adaptively adjust the degree of reduction in luminance based on a viewing behavior of a user by using a hybrid luminance reduction method and may thus increase an effect of reducing an afterimage without hindering the visibility for the user.

The example embodiments may set a lower limit of a target compensation gain based on an amount of accumulated driving time to prevent luminance from being excessively reduced under a viewing condition where stress is large.

The example embodiments may set an upper limit of the target compensation gain based on the amount of accumulated driving time to prevent the occurrence of an inverse afterimage caused by overcompensation or an increase in device luminance.

The effects and advantages according to example embodiments of the present disclosure are not limited to the above examples, and other various effects and advantages may be realized in practice.

Example embodiments of the present disclosure may be described as follows.

In one or more example embodiments, an electroluminescent display apparatus may include: a display panel including a plurality of pixels, each of the pixels including a light emitting device; and a controller configured to receive an input image data for a corresponding pixel among the pixels, determine accumulated stress data applied to the light emitting device in the corresponding pixel due to an accumulation of image implemented in the corresponding pixel while being driven, determine a stress compensation gain corresponding to the accumulated stress data, determine a target compensation gain based on the stress compensation gain and at least one of a lower limit compensation gain and an upper limit compensation gain, and output a corrected input image data based on the input image data and the target compensation gain for driving the corresponding pixel.

In some example embodiments, the controller may be further configured to count a length of driving time, during which the light emitting device emits light, to output an amount of accumulated driving time. The lower limit compensation gain and the upper limit compensation gain may each correspond to the amount of accumulated driving time.

In some example embodiments, the electroluminescent display apparatus may further include a memory circuit configured to store a target compensation gain graph representing a set range of the target compensation gain according to the amount of accumulated driving time and the accumulated stress data. The set range of the target compensation gain may comprise a timer lower limit representing the lower limit compensation gain, a timer upper limit representing the upper limit compensation gain, and a gain region surrounded by the timer lower limit and the timer upper limit in the target compensation gain graph. The stress compensation gain may be within the gain region of the target compensation gain graph.

In some example embodiments, the timer lower limit and the timer upper limit may have a same first target compensation gain at a first amount of accumulated driving time in the target compensation gain graph. The timer lower limit and the timer upper limit may have a same second target compensation gain at a second amount of accumulated driving time in the target compensation gain graph, the second amount of accumulated driving time being greater than the first amount of accumulated driving time. At a third amount of accumulated driving time in the target compensation gain graph between the first amount of accumulated driving time and the second amount of accumulated driving time, the timer lower limit may have a third target compensation gain, and the timer upper limit may have a fourth target compensation gain. The first target compensation gain may be 1, the second target compensation gain may be 0.5, the third target compensation gain may have a first value between 0.5 and 1, and the fourth target compensation gain may have a second value between 0.5 and 1. The second value may be greater than the first value.

In some example embodiments, the timer lower limit may comprise a first lower limit line having a first slope and a second lower limit line having a second slope gentler than the first slope, and the first lower limit line and the second lower limit line may be connected with each other at a first inflection point in the target compensation gain graph. The timer upper limit may comprise a first upper limit line having a third slope and a second upper limit line having a fourth slope gentler than the third slope, and the first upper limit line and the second upper limit line may be connected with each other at a second inflection point in the target compensation gain graph.

In some example embodiments, the first lower limit line having the first slope may meet the first upper limit line having the third slope at a first amount of accumulated driving time in the target compensation gain graph. The second lower limit line having the second slope may meet the second upper limit line having the fourth slope at a second amount of accumulated driving time greater than the first amount of accumulated driving time in the target compensation gain graph. A first target compensation gain corresponding to the first lower limit line and the first upper limit line at the first amount of accumulated driving time may be 1, and a second target compensation gain corresponding to the second lower limit line and the second upper limit line at the second amount of accumulated driving time may be 0.5.

In some example embodiments, the electroluminescent display apparatus may further include a data driver configured to drive the corresponding pixel based on the corrected image data.

In other example embodiments, a method of driving an electroluminescent display apparatus, comprising a display panel including a plurality of pixels each having a light emitting device, may include: receiving an input image data for a corresponding pixel among the pixels; determining accumulated stress data applied to the light emitting device in the corresponding pixel due to an accumulation of image implemented in the corresponding pixel while driven; determining a stress compensation gain corresponding to the accumulated stress data; calculating a target compensation gain based on the stress compensation gain and at least one of a lower limit compensation gain and an upper limit compensation gain; outputting a corrected input image data based on the input image data and the target compensation gain; and driving the corresponding pixel based on the corrected input image data.

In some example embodiments, the method may further include counting a length of driving time, during which the light emitting device emits light, to output an amount of accumulated driving time. The lower limit compensation gain and the upper limit compensation gain may each correspond to the amount of accumulated driving time.

In some example embodiments, the method may further include storing a target compensation gain graph representing a set range of the target compensation gain according to the amount of accumulated driving time and the accumulated stress data. The set range of the target compensation gain may comprise a timer lower limit representing the lower limit compensation gain, a timer upper limit representing the upper limit compensation gain, and a gain region surrounded by the timer lower limit and the timer upper limit in the target compensation gain graph. The stress compensation gain may be within the gain region of the target compensation gain graph.

In some example embodiments, the timer lower limit and the timer upper limit may have a same first target compensation gain at a first amount of accumulated driving time in the target compensation gain graph. The timer lower limit and the timer upper limit may have a same second target compensation gain at a second amount of accumulated driving time in the target compensation gain graph, the second amount of accumulated driving time being greater than the first amount of accumulated driving time. At a third amount of accumulated driving time in the target compensation gain graph between the first amount of accumulated driving time and the second amount of accumulated driving time, the timer lower limit may have a third target compensation gain, and the timer upper limit may have a fourth target compensation gain. The first target compensation gain may be 1, the second target compensation gain may be 0.5, the third target compensation gain may have a first value between 0.5 and 1, and the fourth target compensation gain may have a second value between 0.5 and 1. The second value may be greater than the first value.

In some example embodiments, the timer lower limit may comprise a first lower limit line having a first slope and a second lower limit line having a second slope gentler than the first slope, and the first lower limit line and the second lower limit line may be connected with each other at a first inflection point in the target compensation gain graph. The timer upper limit may comprise a first upper limit line having a third slope and a second upper limit line having a fourth slope gentler than the third slope, and the first upper limit and the second upper limit may be connected with each other at a second inflection point in the target compensation gain graph.

In some example embodiments, the first lower limit line having the first slope may meet the first upper limit line having the third slope at a first amount of accumulated driving time in the target compensation gain graph. The second lower limit line having the second slope may meet the second upper limit line having the fourth slope at a second amount of accumulated driving time greater than the first amount of accumulated driving time in the target compensation gain graph. A first target compensation gain corresponding to the first lower limit line and the first upper limit line at the first amount of accumulated driving time may be 1, and a second target compensation gain corresponding to the second lower limit and the second upper limit at the second amount of accumulated driving time may be 0.5.

In other example embodiments, a display apparatus may include: a display panel including a plurality of pixels, each of the pixels including a light emitting device; and a controller configured to receive an input image data for a corresponding pixel among the pixels, determine accumulated stress data representing accumulated stress applied to the light emitting device of the corresponding pixel due to an image implemented in the corresponding pixel while driven, determine a target compensation gain based on the accumulated stress data, and output a corrected input image data based on the input image data and the target compensation gain; and a driver configured to drive the corresponding pixel based on the corrected image data.

In some example embodiments, the controller may be further configured to determine an amount of accumulated driving time during which the light emitting device emits light and to determine the target compensation gain based on the amount of accumulated driving time and the accumulated stress data.

In some example embodiments, the controller may be further configured to determine a lower limit compensation gain and an upper limit compensation gain each corresponding to the amount of accumulated driving time, determine a stress compensation gain corresponding to the accumulated stress data, and determine the target compensation gain based on the lower limit compensation gain, the upper limit compensation gain, and the stress compensation gain.

In some example embodiments, the display apparatus may further include a memory circuit configured to store a target compensation gain graph representing a predetermined range of the target compensation gain according to the amount of accumulated driving time and the accumulated stress data. The predetermined range of the target compensation gain may comprise a timer lower limit representing the lower limit compensation gain, a timer upper limit representing the upper limit compensation gain, and a gain region surrounded by the timer lower limit and the timer upper limit in the target compensation gain graph. The stress compensation gain may be within the gain region of the target compensation gain graph.

In some example embodiments, the timer lower limit and the timer upper limit may have a same first target compensation gain at a first amount of accumulated driving time in the target compensation gain graph. The timer lower limit and the timer upper limit may have a same second target compensation gain at a second amount of accumulated driving time in the target compensation gain graph, the second amount being is greater than the first amount. At a third amount of accumulated driving time in the target compensation gain graph between the first amount of accumulated driving time and the second amount of accumulated driving time, the timer lower limit may have a third target compensation gain, and the timer upper limit may have a fourth target compensation gain. The first target compensation gain may be 1, the second target compensation gain may be 0.5, the third target compensation gain may have a first value between 0.5 and 1, and the fourth target compensation gain may have a second value between 0.5 and 1. The second value may be greater than the first value.

In some example embodiments, the timer lower limit may comprise a first lower limit line having a first slope and a second lower limit line having a second slope gentler than the first slope, and the first lower limit line and the second lower limit line may meet each other at a first inflection point in the target compensation gain graph. The timer upper limit may comprise a first upper limit line having a third slope and a second upper limit line having a fourth slope gentler than the third slope, and the first upper limit line and the second upper limit line may meet each other at a second inflection point in the target compensation gain graph.

In some example embodiments, the controller may include: a first lookup table configured to provide the lower limit compensation gain based on the amount of accumulated driving time; a second lookup table configured to provide the upper limit compensation based on the amount of accumulated driving time; and a third lookup table configured to provide the stress compensation gain based on the accumulated stress data.

As set forth above, specific example embodiments of the present disclosure have been described in more detail with reference to the accompanying drawings. However, the present disclosure is not limited to the foregoing example embodiments, but a variety of modifications are possible without departing from the principle of the present disclosure. Thus, the foregoing example embodiments disclosed herein should be interpreted as being illustrative, while not being limiting, of the principle of the present disclosure, and the scope of the present disclosure is not limited to the foregoing example embodiments. Therefore, the foregoing example embodiments should not be construed as being exhaustive in any aspects.

It will be apparent to those skilled in the art that various modifications and variations can be made in the present disclosure without departing from the spirit or scope of the disclosure. Thus, it is intended that the present disclosure cover such modifications and variations of this disclosure.

What is claimed is:

1. An electroluminescent display apparatus, comprising:

a display panel including a plurality of pixels, each of the pixels including a light emitting device; and a controller configured to:

receive an input image data for a corresponding pixel among the pixels;

determine accumulated stress data applied to the light emitting device in the corresponding pixel due to an accumulation of image implemented in the corresponding pixel while being driven;

determine a stress compensation gain corresponding to the accumulated stress data;

determine a target compensation gain based on the stress compensation gain and at least one of a lower limit compensation gain and an upper limit compensation gain; and output a corrected input image data based on the input image data and the target compensation gain for driving the corresponding pixel, wherein a set range of the target compensation gain comprises a timer lower limit representing the lower limit compensation gain, a timer upper limit representing the upper limit compensation gain, and a gain region surrounded by the timer lower limit and the timer upper limit in a target compensation gain graph.

2. The electroluminescent display apparatus of claim 1, wherein:

the controller is further configured to count a length of driving time, during which the light emitting device emits light, to output an amount of accumulated driving time, and the lower limit compensation gain and the upper limit compensation gain each correspond to the amount of accumulated driving time.

3. The electroluminescent display apparatus of claim 2, further comprising:

a memory circuit configured to store the target compensation gain graph representing the set range of the target compensation gain according to the amount of accumulated driving time and the accumulated stress data, wherein the stress compensation gain is within the gain region of the target compensation gain graph.

4. The electroluminescent display apparatus of claim 3, wherein:

the timer lower limit and the timer upper limit have a same first target compensation gain at a first amount of accumulated driving time in the target compensation gain graph, the timer lower limit and the timer upper limit have a same second target compensation gain at a second amount of accumulated driving time in the target compensation gain graph, the second amount of accumulated driving time being greater than the first amount of accumulated driving time, at a third amount of accumulated driving time in the target compensation gain graph between the first amount of accumulated driving time and the second amount of accumulated driving time, the timer lower limit has a third target compensation gain, and the timer upper limit has a fourth target compensation gain, the first target compensation gain is 1, the second target compensation gain is 0.5, the third target compensation gain has a first value between 0.5 and 1, and the fourth target compensation gain has a second value between 0.5 and 1, and the second value is greater than the first value.

5. The electroluminescent display apparatus of claim 3, wherein:

the timer lower limit comprises a first lower limit line having a first slope and a second lower limit line having a second slope gentler than the first slope, and the first lower limit line and the second lower limit line are connected with each other at a first inflection point in the target compensation gain graph, and the timer upper limit comprises a first upper limit line having a third slope and a second upper limit line having a fourth slope gentler than the third slope, and the first upper limit line and the second upper limit line are connected with each other at a second inflection point in the target compensation gain graph.

6. The electroluminescent display apparatus of claim 5, wherein:

the first lower limit line having the first slope meets the first upper limit line having the third slope at a first amount of accumulated driving time in the target compensation gain graph, the second lower limit line having the second slope meets the second upper limit line having the fourth slope at a second amount of accumulated driving time greater than the first amount of accumulated driving time in the target compensation gain graph, a first target compensation gain corresponding to the first lower limit line and the first upper limit line at the first amount of accumulated driving time is 1, and a second target compensation gain corresponding to the second lower limit line and the second upper limit line at the second amount of accumulated driving time is 0.5.

7. The electroluminescent display apparatus of claim 1, further comprising:

a data driver configured to drive the corresponding pixel based on the corrected image data.

8. A method of driving an electroluminescent display apparatus comprising a display panel including a plurality of pixels each having a light emitting device, the method comprising:

receiving an input image data for a corresponding pixel among the pixels;

determining accumulated stress data applied to the light emitting device in the corresponding pixel due to an accumulation of image implemented in the corresponding pixel while driven;

determining a stress compensation gain corresponding to the accumulated stress data;

calculating a target compensation gain based on the stress compensation gain and at least one of a lower limit compensation gain and an upper limit compensation gain;

outputting a corrected input image data based on the input image data and the target compensation gain; and driving the corresponding pixel based on the corrected input image data, wherein a set range of the target compensation gain comprises a timer lower limit representing the lower limit compensation gain, a timer upper limit representing the upper limit compensation gain, and a gain region surrounded by the timer lower limit and the timer upper limit in a target compensation gain graph.

9. The method of claim 8, further comprising:

counting a length of driving time, during which the light emitting device emits light, to output an amount of accumulated driving time, wherein the lower limit compensation gain and the upper limit compensation gain each correspond to the amount of accumulated driving time.

10. The method of claim 9, further comprising:

storing the target compensation gain graph representing the set range of the target compensation gain according to the amount of accumulated driving time and the accumulated stress data, wherein the stress compensation gain is within the gain region of the target compensation gain graph.

11. The method of claim 10, wherein:

the timer lower limit and the timer upper limit have a same first target compensation gain at a first amount of accumulated driving time in the target compensation gain graph, the timer lower limit and the timer upper limit have a same second target compensation gain at a second amount of accumulated driving time in the target compensation gain graph, the second amount of accumulated driving time being greater than the first amount of accumulated driving time, at a third amount of accumulated driving time in the target compensation gain graph between the first amount of accumulated driving time and the second amount of accumulated driving time, the timer lower limit has a third target compensation gain, and the timer upper limit has a fourth target compensation gain, the first target compensation gain is 1, the second target compensation gain is 0.5, the third target compensation gain has a first value between 0.5 and 1, and the fourth target compensation gain has a second value between 0.5 and 1, and the second value is greater than the first value.

12. The method of claim 10, wherein:

the timer lower limit comprises a first lower limit line having a first slope and a second lower limit line having a second slope gentler than the first slope, and the first lower limit line and the second lower limit line are connected with each other at a first inflection point in the target compensation gain graph, and the timer upper limit comprises a first upper limit line having a third slope and a second upper limit line having a fourth slope gentler than the third slope, and the first upper limit and the second upper limit are connected with each other at a second inflection point in the target compensation gain graph.

13. The method of claim 12, wherein:

the first lower limit line having the first slope meets the first upper limit line having the third slope at a first amount of accumulated driving time in the target compensation gain graph, the second lower limit line having the second slope meets the second upper limit line having the fourth slope at a second amount of accumulated driving time greater than the first amount of accumulated driving time in the target compensation gain graph, a first target compensation gain corresponding to the first lower limit line and the first upper limit line at the first amount of accumulated driving time is 1, and a second target compensation gain corresponding to the second lower limit and the second upper limit at the second amount of accumulated driving time is 0.5.

14. A display apparatus, comprising:

a display panel including a plurality of pixels, each of the pixels including a light emitting device; and a controller configured to:

receive an input image data for a corresponding pixel among the pixels;

determine accumulated stress data representing accumulated stress applied to the light emitting device of the corresponding pixel due to an image implemented in the corresponding pixel while driven;

determine a target compensation gain based on the accumulated stress data; and output a corrected input image data based on the input image data and the target compensation gain; and a driver configured to drive the corresponding pixel based on the corrected image data, wherein a predetermined range of the target compensation gain comprises a timer lower limit representing the lower limit compensation gain, a timer upper limit representing the upper limit compensation gain, and a gain region surrounded by the timer lower limit and the timer upper limit in a target compensation gain graph.

15. The display apparatus of claim 14, wherein the controller is further configured to:

determine an amount of accumulated driving time during which the light emitting device emits light; and determine the target compensation gain based on the amount of accumulated driving time and the accumulated stress data.

16. The display apparatus of claim 15, wherein the controller is further configured to:

determine a lower limit compensation gain and an upper limit compensation gain each corresponding to the amount of accumulated driving time;

determine a stress compensation gain corresponding to the accumulated stress data; and determine the target compensation gain based on the lower limit compensation gain, the upper limit compensation gain, and the stress compensation gain.

17. The display apparatus of claim 16, further comprising:

a memory circuit configured to store the target compensation gain graph representing the predetermined range of the target compensation gain according to the amount of accumulated driving time and the accumulated stress data, wherein the stress compensation gain is within the gain region of the target compensation gain graph.

18. The display apparatus of claim 17, wherein:

the timer lower limit and the timer upper limit have a same first target compensation gain at a first amount of accumulated driving time in the target compensation gain graph, the timer lower limit and the timer upper limit have a same second target compensation gain at a second amount of accumulated driving time in the target compensation gain graph, the second amount being is greater than the first amount, at a third amount of accumulated driving time in the target compensation gain graph between the first amount of accumulated driving time and the second amount of accumulated driving time, the timer lower limit has a third target compensation gain, and the timer upper limit has a fourth target compensation gain, the first target compensation gain is 1, the second target compensation gain is 0.5, the third target compensation gain has a first value between 0.5 and 1, and the fourth target compensation gain has a second value between 0.5 and 1, and the second value is greater than the first value.

19. The display apparatus of claim 17, wherein:

the timer lower limit comprises a first lower limit line having a first slope and a second lower limit line having a second slope gentler than the first slope, and the first lower limit line and the second lower limit line meet each other at a first inflection point in the target compensation gain graph, and the timer upper limit comprises a first upper limit line having a third slope and a second upper limit line having a fourth slope gentler than the third slope, and the first upper limit line and the second upper limit line meet each other at a second inflection point in the target compensation gain graph.

20. The display apparatus of claim 17, wherein the controller comprises:

a first lookup table configured to provide the lower limit compensation gain based on the amount of accumulated driving time;

a second lookup table configured to provide the upper limit compensation based on the amount of accumulated driving time; and a third lookup table configured to provide the stress compensation gain based on the accumulated stress data.

* * * * *